(12) United States Patent
Okamoto et al.

(10) Patent No.: US 8,116,600 B2
(45) Date of Patent: Feb. 14, 2012

(54) OPTICAL PHASE MODULATION ELEMENT AND OPTICAL MODULATOR USING THE SAME

(75) Inventors: Daisuke Okamoto, Tokyo (JP); Masafumi Nakada, Tokyo (JP); Junichi Fujikata, Tokyo (JP)

(73) Assignee: NEC Corporation, Tokyo (JP)

( * ) Notice: Subject to any disclaimer, the term of this patent is extended or adjusted under 35 U.S.C. 154(b) by 357 days.

(21) Appl. No.: 12/526,107

(22) PCT Filed: Dec. 25, 2007

(86) PCT No.: PCT/JP2007/074813
§ 371 (c)(1), (2), (4) Date: Aug. 6, 2009

(87) PCT Pub. No.: WO2008/102511
PCT Pub. Date: Aug. 28, 2008

(65) Prior Publication Data
US 2010/0316325 A1    Dec. 16, 2010

(30) Foreign Application Priority Data
Feb. 19, 2007   (JP) ................... 2007-037935

(51) Int. Cl.
G02F 1/01      (2006.01)
G02F 1/035     (2006.01)

(52) U.S. Cl. ............. 385/3; 385/1; 385/2; 385/39
(58) Field of Classification Search ............ 385/1–3, 385/14, 39, 40, 122, 129–132
See application file for complete search history.

(56) References Cited

U.S. PATENT DOCUMENTS 7,471,852 B2 * 12/2008 Hamada ................. 385/2

FOREIGN PATENT DOCUMENTS

| JP | 2-124540 A | 5/1990 |
| JP | 2-136822 A | 5/1990 |
| JP | 7-120636 A | 5/1995 |
| JP | 9-061759 A | 3/1997 |
| JP | 2003084153 A | 3/2003 |
| JP | 2003084249 A | 3/2003 |
| JP | 2003518647 A | 6/2003 |
| JP | 2004102097 A | 4/2004 |
| JP | 2006343410 A | 12/2006 |

OTHER PUBLICATIONS

International Search Report for PCT/JP2007/074813 mailed Feb. 5, 2008.
A Liu et al., "A high-speed silicon optical modulator based on a metal-oxide-semiconductor capacitor", Nature, Feb. 12, 2004, vol. 427, p. 615-618.

* cited by examiner

*Primary Examiner* — Brian M. Healy
*Assistant Examiner* — Mary El Shammaa

(57) ABSTRACT

Provided is a small-size optical phase modulation element and an optical modulator using it. The optical phase modulation element includes a Plasmon waveguide having a clad made of a metal material having a complex dielectric constant having a negative real part in the used wavelength and a core formed by a dielectric metal material having a complex dielectric constant having a positive real part in the used wavelength. The Plasmon waveguide is connected to an optical waveguide including a clad and a core both having a complex dielectric constant having a positive real part. The core of the Plasmon waveguide and the core of the optical waveguide are formed, at least partially, of the same semiconductor material. The Plasmon waveguide has a function to phase-modulate the incident light when voltage is applied.

11 Claims, 5 Drawing Sheets

OPTICAL PHASE MODULATION ELEMENT AND OPTICAL MODULATOR USING THE SAME

The present application is the National Phase of PCT/JP2007/074813, filed Dec. 25, 2007, which is based upon and claims priority from Japanese Patent Application Number 2007-037935, filed Feb. 19, 2007, the disclosure of which is hereby incorporated by reference herein in its entirety.

TECHNICAL FIELD

The present invention relates to an optical phase modulation element and an optical modulator using the same, which are usable in optical communication and optical lines.

BACKGROUND ART

Recently, because optical communication traffic is showing rapid growth, optical modulators that convert an electric signal into an optical signal act as very important key devices. Among the optical modulators, an electroabsorption modulator and a Mach-Zehnder modulator based on a specific material such as compound semiconductor or $LiNbO_3$ have been put to practical use. However, there are problems of expensive manufacturing costs as well as high integration, which are difficult to overcome. As an approach to solve that problem, a Metal Oxide Semiconductor (MOS) optical modulator was proposed in Non-Patent Document 1 by A Liu and seven (7) others, "*A high-speed silicon optical modulator based on a metal-oxide-semiconductor capacitor*" (Nature, Feb. 12, 2004, Vol. 42, p. 615-618). This modulator has merit in that it can be manufactured inexpensively price by a Chemical Metal Oxide Semiconductor (CMOS) process. The MOS optical modulator operates according to the principle that the refractive index of a charge accumulation area is changed by a carrier plasma effect. However, in the optical modulator according to Non-Patent Document 1, a charge accumulation layer is thick in the order of just several tens of micrometers, whereas guiding mode is wide in the order of several micrometers. The result is a low phase modulation effect and a large size (e.g., about 1 cm) since the guiding mode overlaps the refractive index modulation area in a limited range. This as a result causes a problem to the difficulty of high speed operation.

In addition, Patent Document 1 (Japanese Patent No. 2716081) has proposed an optical modulator using a two-dimensional optical waveguide (e.g., a Plasmon waveguide) in which a medium having an electro-optic effect is sandwiched by using metal. This document explains that a small optical modulator can be realized to operate at a very low voltage by setting a two-dimensional optical metal gap waveguide to be sufficiently smaller than the wavelength of incident light. Here, for example, the optical modulator has an operating voltage of 0.1 V, and a length of 6 μm, and the electro-optic medium has a thickness of 6 nm. However, there is a very difficult problem of injecting incident light into the metal gap, which is much smaller than the wavelength of the incident light.

As described above, in the MOS optical modulator described in Non-Patent Document 1, light propagating along the waveguide to which a voltage is applied has a small amount of phase conversion per unit length. Thus, when a Mach-Zehnder interferometer is combined, an increasing length of the waveguide is required in order to increase the modulation ratio by setting the phase difference of two light beams to about π. This as a result causes problems such as an increasing device size of the optical modulator as well as high integration and high speed requirements, which are difficult to achieve.

Furthermore, in the Plasmon waveguide including a waveguide clad made of metal having a complex dielectric constant with a negative real part, propagation loss is generally greater than that of a typical optical waveguide, which is made of core and clad materials having a complex dielectric constant with a positive real part. Therefore, an optical circuit is preferably constructed using the Plasmon waveguide only in the case of phase modulation but using the typical optical waveguide in other cases. In this case, although the Plasmon waveguide and the typical waveguide are required to be coupled with high efficiency, this coupling is difficult to overcome.

DISCLOSURE

One object of the invention is to provide an optical phase modulation element and an optical modulator using the same, which can overcome at least one of the foregoing problems. One example of this object associated with an optical phase modulation element and an optical modulator using the same is to raise phase modulation efficiency and significantly reduce the device size of the optical modulator. Further, other objects are to provide a phase modulation element, which can couple with a typical optical waveguide, while using a Plasmon waveguide, and to reduce the loss of an optical modulator.

One aspect of the invention is an optical phase modulation element constructed with a Plasmon waveguide. The clad of the Plasmon waveguide adopted in the invention is made of metal having a complex dielectric constant with a negative real part. Furthermore, at least part of the core of the Plasmon waveguide is made of a specific type of semiconductor material, the refractive index of which can be modulated by changing carrier density using a voltage applied thereto.

Furthermore, another aspect of the invention is an optical modulator constructed with a Mach-Zehnder interferometer or an optical oscillator. The Mach-Zehnder interferometer or optical oscillator of the invention includes an optical phase modulation element of the invention and an optical waveguide, which is connected to the optical phase modulation element and which has a core made of the same semiconductor material as the optical phase modulation element.

BEST MODE

The invention will now be described hereinafter with reference to the accompanying drawings.

First Embodiment

Figure 1:
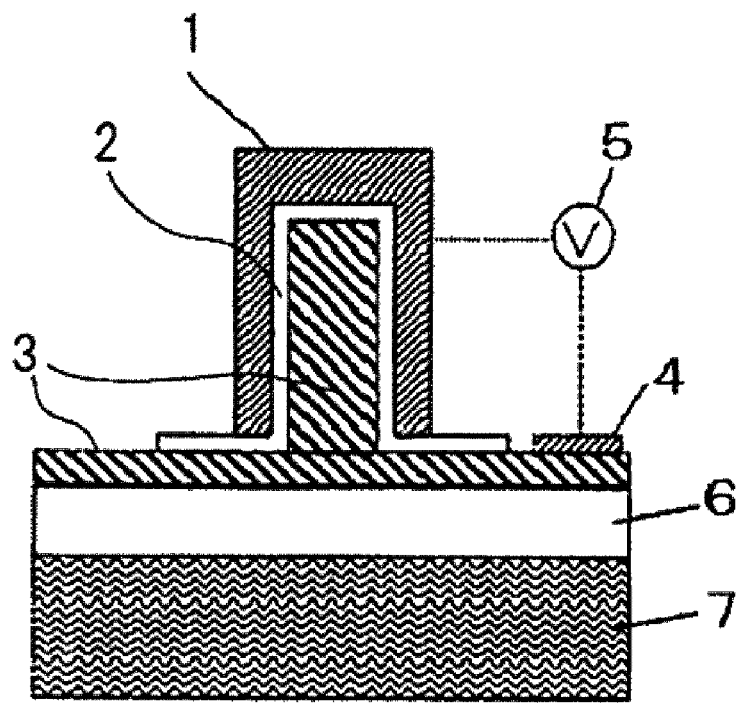
FIG. 1 is a cross-sectional view illustrating an MIS type optical phase modulation element according to a first embodiment of the invention.

FIG. 1 is a cross-sectional view illustrating a Metal Insulator Semiconductor (MIS) type optical phase modulation element according to a first embodiment of the invention, taken in a direction crossing a waveguide direction. In this figure, embedded oxide layer 6 is formed on the principle surface of substrate 7, n-semiconductor 3 is formed on embedded oxide layer 6, and a part of n-semiconductor 3 opposite to substrate 7 is formed as a protrusion extending in one direction. Metal clad 1 is provided on the surface of n-semiconductor 3 including the protrusion, with insulating film 2 sandwiched between metal clad 1 and n-semiconductor 3. This structure is referred to as an MIS capacitor structure. In addition, due to this structure, a Plasmon waveguide is formed, in which the protrusion of n-semiconductor 3 and insulating film 2 act as a waveguide core and metal clad 1 acts as a waveguide clad, so that surface Plasmon polariton is guided in a direction perpendicular to the plane of paper. Specifically, with respect to a used wavelength, a clad can be made of metal material having a complex dielectric constant with a negative real part and the Plasmon waveguide having a core can be made of dielectric material having a complex dielectric constant with a positive real part. In addition, metal clad 1 also acts as an electrode, and a voltage is applied between metal clad 1 and electrode 4 through voltage source 5 so that a bias voltage is applied to metal clad 1. Thereby, electric charges are accumulated in n-semiconductor 3 adjacent to insulating film 2 and thus change the index of refraction of that part. Here, a voltage can be applied between the clad part (i.e., metal clad 1) of the Plasmon waveguide and a core part (i.e., the part consisting of the protrusion of n-semiconductor 3 and insulating film 2). Thereby, the equivalent refractive index of the Plasmon waveguide can be changed by modulating carrier density of n-semiconductor 3, and incident light passing through the optical phase modulation element can be phase-modulated.

Examples of the semiconductor material of n-semiconductor 3 may preferably be any material that absorbs a small amount of incident light at the used wavelength. Si is particularly preferable in view of processability, low price, mass productivity, etc. In addition, insulating film 2 may preferably be made of any insulating material, and although not particularly limited, may more preferably be made of a material, which can easily form a stable layer, such as $SiO_2$, SiON, and SiN. Further, when insulating film 2 is made of ferroelectric material having a high dielectric constant, modulation in refractive index can be further enhanced by increasing the amount of electric charges accumulating in n-semiconductor 3. In addition, metal clad 1 may preferably be made of metal having a complex dielectric constant with a negative real part with respect to a used wavelength, and although not particularly limited, may more preferably be made of metal having little electric resistance or surface Plasmon loss such as Ag and Au. However, metal clad is not limited to these types of metal, but can be made of Al or Cu, which is widely used in semiconductor devices, and for which a great number of processing techniques have been established. If the metal used in metal clad 1 has poor adherence to insulating film 2, a bonding layer made of Ti, Ta, Cr, W, Ni, etc. can be provided between the metal used in metal clad 1 and insulating film 2. The thickness of the bonding layer is preferably 5 nm or less to reduce optical loss. In addition, although FIG. 1 illustrates the optical phase modulation element using the n-semiconductor, a p-semiconductor can also be used. Here, the same operation can be realized when the positive and negative of the voltage are reversed.

In addition, in the Plasmon waveguide, in order to increase overlap with a refractive index modulation area by obtaining a strong light confinement effect, the width of the protrusion of n-semiconductor 3 forming the waveguide core part is preferably λ/2n or less, where λ is the wavelength of incident light, and n is the refractive index of n-semiconductor 3.

Second Embodiment

Figure 2:
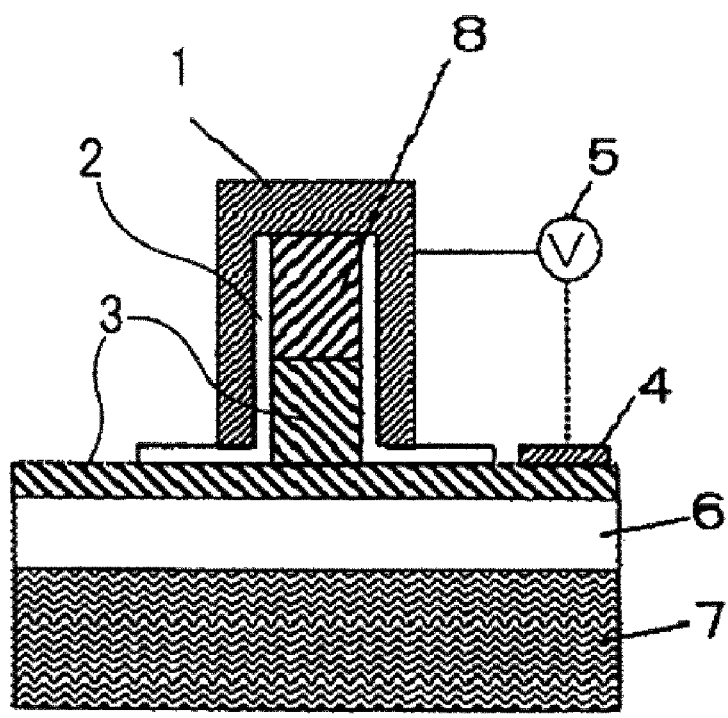
FIG. 2 is a cross-sectional view illustrating a P-N type optical phase modulation element according to a second embodiment of the invention.

FIG. 2 is a cross-sectional view illustrating a P-N type optical phase modulation element according to a second embodiment of the invention, taken in a direction crossing a waveguide direction. As shown in the figure, this embodiment is different in a semiconductor structure forming a part of waveguide core from the MIS optical phase modulation element of the first embodiment. Specifically, p-semiconductor 8 is stacked on a protrusion of n-semiconductor 3, and metal clad 1 is provided on the protrusion with insulating film 2 sandwiched between metal clad 1 and the protrusion. In addition, the top surface of p-semiconductor 8 is not coated with insulating film 2 but is in close contact with metal clad 1. The other construction is the same as in the first embodiment.

The modulation element of this construction can modulate the equivalent refractive index of a Plasmon waveguide by changing carrier density when carriers are injected into P-N junction semiconductor, which is formed of n-semiconductor 3 and p-semiconductor 8.

Furthermore, this embodiment has advantages in that the thickness of a depletion layer can be controlled using an intrinsic semiconductor layer sandwiched between n-semiconductor 3 and p-semiconductor 8, and an area subjected to refractive index modulation due to carrier injection can be freely designed.

Third Embodiment

Figure 3:
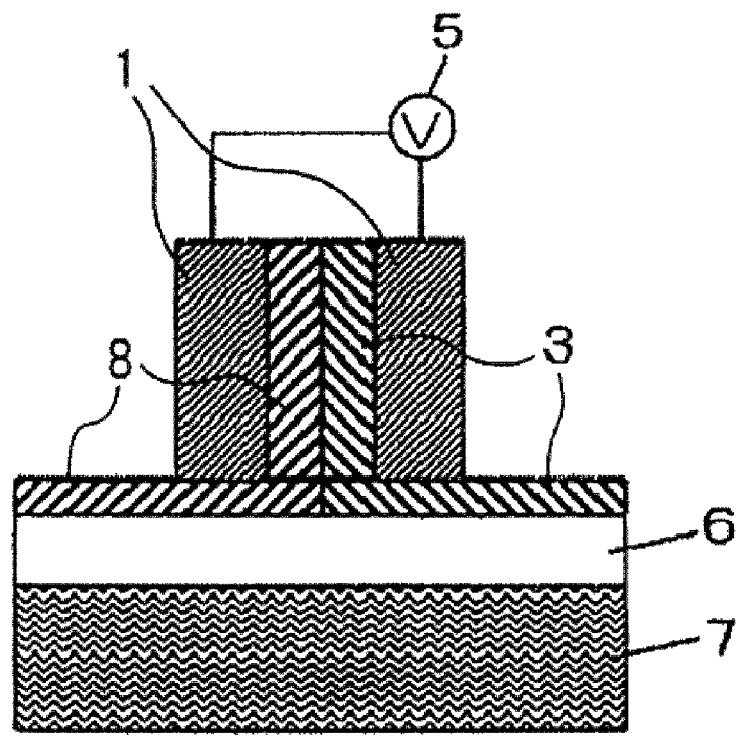
FIG. 3 is a cross-sectional view illustrating a P-N type optical phase modulation element according to a third embodiment of the invention.

FIG. 3 is a cross-sectional view illustrating a P-N type optical phase modulation element according to a third embodiment of the invention, taken in a direction crossing a waveguide direction. As illustrated in the figure, this embodiment is different in a semiconductor structure of a waveguide core and a waveguide clad structure from the previous two embodiments. Specifically, n-semiconductor 3 and p-semiconductor 8 formed on embedded oxide layer 6 along the in-plane direction (i.e., the lateral direction in the figure) make a P-N junction structure. The semiconductor part having this P-N junction forms a protrusion that protrudes in a direction opposite to substrate 7. In addition, two metal clads 1 are disposed with both the right and left sides of the protrusion sandwiched between metal clads 1. Two metal clads 1 have a function as positive-negative electrodes, with one of metal clads 1 in close contact with n-semiconductor 3 and the other metal clad 1 in close contact with p-semiconductor 8. The other construction is the same as in the first embodiment.

This embodiment has an advantage in that propagation loss is relatively small since the upper portion of the semiconductor structure forming the waveguide core is not coated with metal clad 1.

Fourth Embodiment

Figure 4:
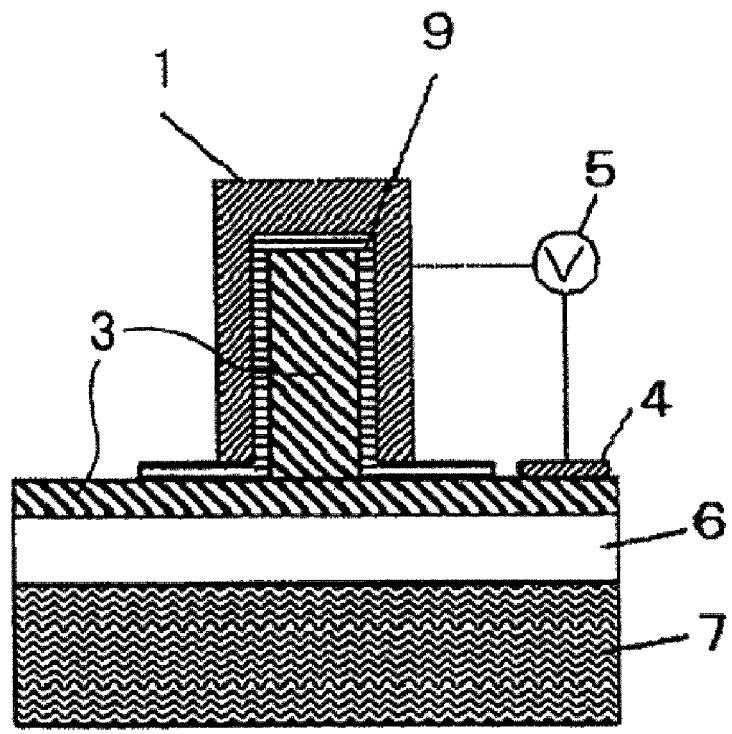
FIG. 4 is a cross-sectional view illustrating an optical phase modulation element using electro-optic material according to a fourth embodiment of the invention.

FIG. 4 is a cross-sectional view illustrating an optical phase modulation element using electro-optic material according to a fourth embodiment of the invention. As shown in this figure, this embodiment is characterized in that electro-optic material 9 is sandwiched between metal clad 1 and n-semiconductor 3 of the modulation element of the first embodiment (shown in FIG. 1) in place of the insulating film. The other construction is the same as in the first embodiment.

Electro-optic material 9 can be made of lithium niobate, lanthanum-doped lead zirconate titanate (PLZT), namely ferroelectric ceramics, and the like.

In this embodiment, a great amount of refractive index change can be obtained since a great amount of electric field can be applied by thinning electro-optic material 9. As a result, the advantages are that phase modulation can be performed more efficiently and the element can be miniaturized since a change in the refractive index of electro-optic material 9 is applied in addition to a change in the refractive index of n-semiconductor 3.

Fifth Embodiment

Figure 5:
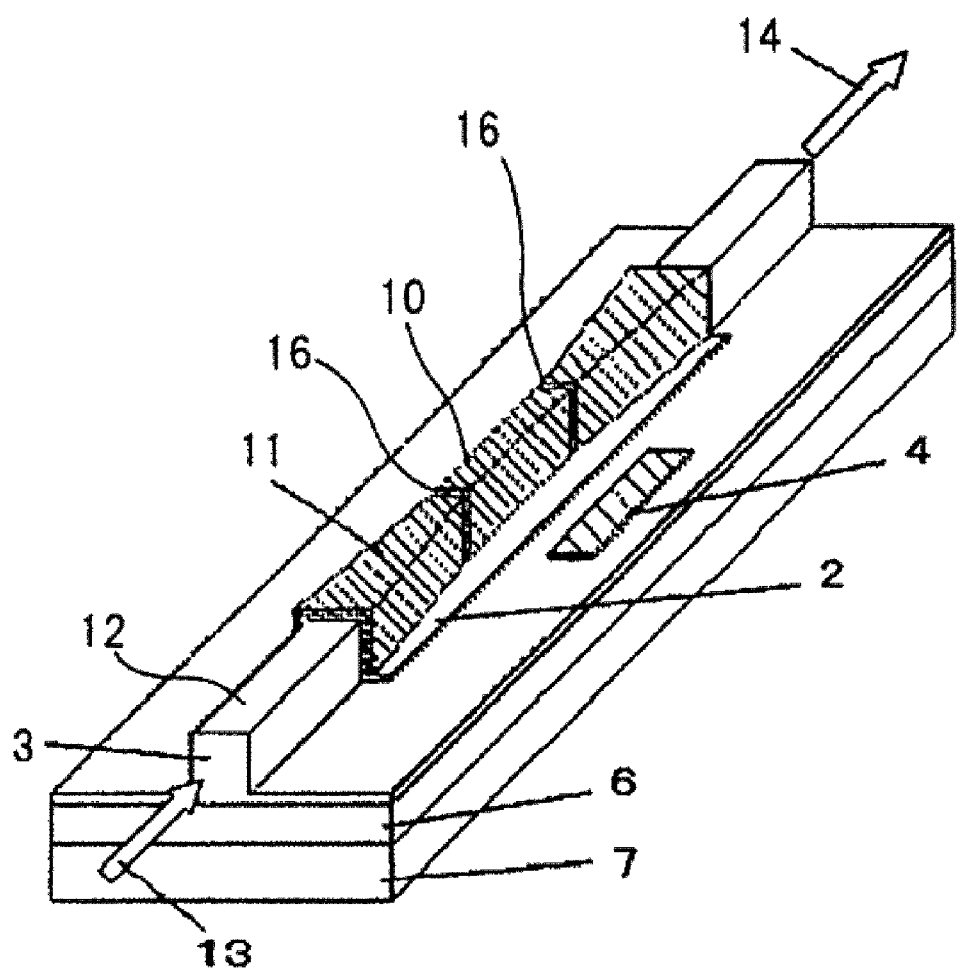
FIG. 5 is a cross-sectional view illustrating an optical phase modulation element coupled with a semiconductor thin-line waveguide via a taper coupling structure according to a fifth embodiment of the invention.

FIG. 5 is a cross-sectional view illustrating an optical phase modulation element coupled with a semiconductor thin-line waveguide via a taper coupling structure according to a fifth embodiment of the invention. As shown in this figure, optical phase modulation element 10 of the invention forms a Plasmon waveguide having a cross-sectional structure as shown in FIG. 1, 3 or 4. An optical waveguide including a clad and a core made of dielectric material having a complex dielectric constant with a positive real part is connected to one end of the Plasmon waveguide in the waveguiding direction. In FIG. 5, the waveguide is a semiconductor thin-line optical waveguide 12, and n-semiconductor 3 that is the same as at least part of the Plasmon waveguide core is used as the material of the clad and the core. This semiconductor thin-line optical waveguide 12 is a protrusion extending in one direction, made of n-semiconductor 3. That is, semiconductor thin-line optical waveguide 12 and optical phase modulation element 10 are continuously connected by the same semiconductor core material.

Furthermore, semiconductor thin-line optical waveguide 12 and optical phase modulation element 10 are connected in an insulated state by taper coupling structure 11. The waveguide core width of optical phase modulation element 10 is narrower than the guiding width of semiconductor thin-line optical waveguide 12, and taper coupling structure 11 is tapered with its width narrowing from semiconductor thin-line optical waveguide 12 to optical phase modulation element 10. In addition, like the structure of 10, this taper coupling structure 11 also includes metal clad 1 sandwiching insulating film 2 on a surface including the protrusion of n-semiconductor 3.

In this structure, taper coupling structure 11 allows incident light 13 propagating along semiconductor thin-line optical waveguide 12 to be coupled with the Plasmon waveguide formed by optical phase modulation element 10 of the invention. Since semiconductor thin-line optical waveguide 12 and optical phase modulation element 10 are connected in an insulated state by taper coupling structure 11, loss can be reduced and a connection can be realized with a length of several micrometers or less. Light beam 14 phase-modulated by optical phase modulation element 10 of the present invention is coupled again with semiconductor thin-line optical waveguide 12 by taper coupling structure 11.

In addition, joints 16 are provided between metal clad 1 of the plasma waveguide of optical phase modulation element 10 of the present invention and metal clad 1 of taper coupling structure 11. Metal clad 1 of optical phase modulation element 10 and metal clad 1 of taper coupling structure 11 are not electrically connected but are substantially continuous in optical terms. Due to this structure, a voltage can be applied only to optical phase modulation element 10, and the element capacity can be reduced. Here, optical loss such as scattering can be suppressed by reducing the interval of joints 16.

Sixth Embodiment

Figure 6:
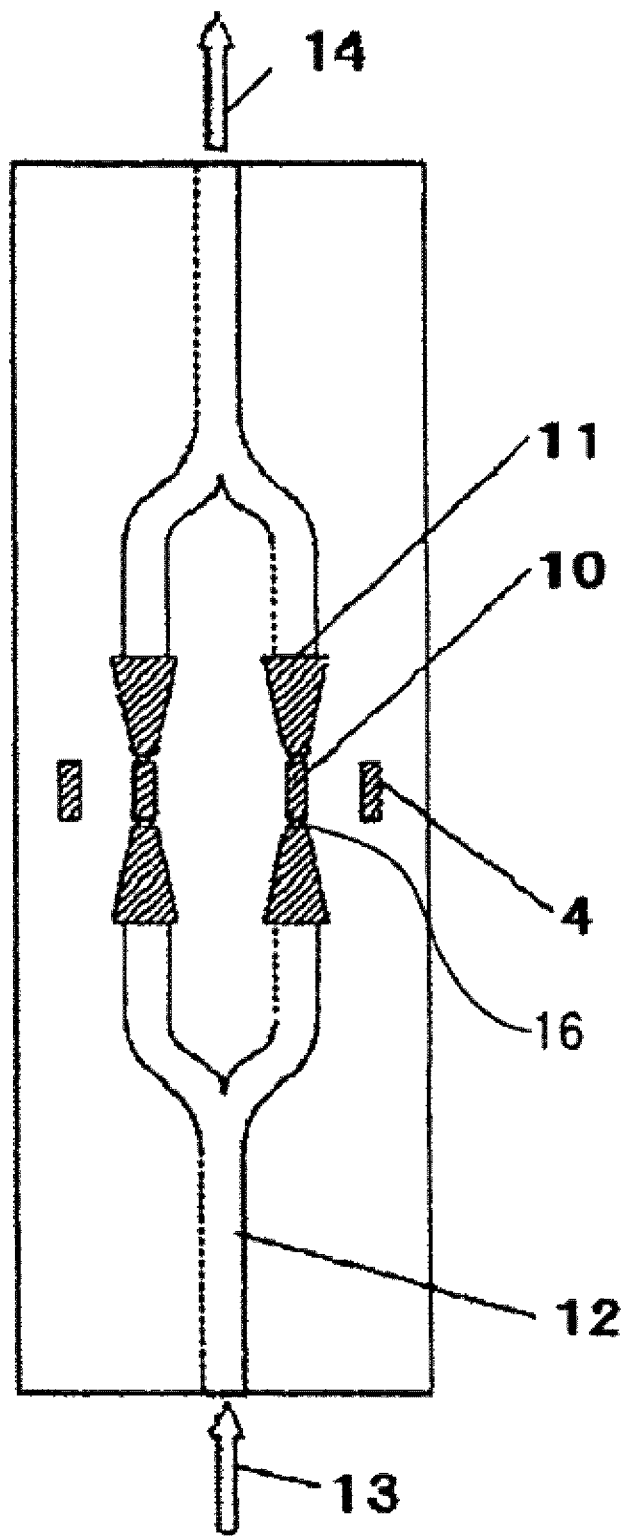
FIG. 6 is a plan view illustrating an optical modulator using a Mach-Zehnder interferometer including an optical phase modulation element of the invention.

FIG. 6 is a plan view illustrating an optical modulator using a Mach-Zehnder interferometer including an optical phase modulation element of the invention. The optical modulator shown in this figure is constructed of a Mach-Zehnder interferometer that is a combination of two optical phase modulation elements 10 of the present invention. In this optical modulator, input light 13 propagating along semiconductor thin-line optical waveguide 12 is divided into two rays, which are in turn introduced to and phase-modulated by respective optical phase modulation elements 10. Strength modulation can be realized by interfering two phase-modulated beams 14 with each other. This division structure may be of a Y division structure shown in the figure, or a Multi Mode Interference (MMI) structure using a multi-mode waveguide.

The size of the optical modulator can be set 100 micrometers or less by using optical phase modulation element 10 of the present invention constructed with the Plasmon waveguide in the optical modulator constructed with a Mach-Zehnder interferometer. Considering that a conventional MOS modulator using Si requires a length of about 1 cm, size reduction of at least two ciphers can be realized.

Seventh Embodiment

Figure 7:
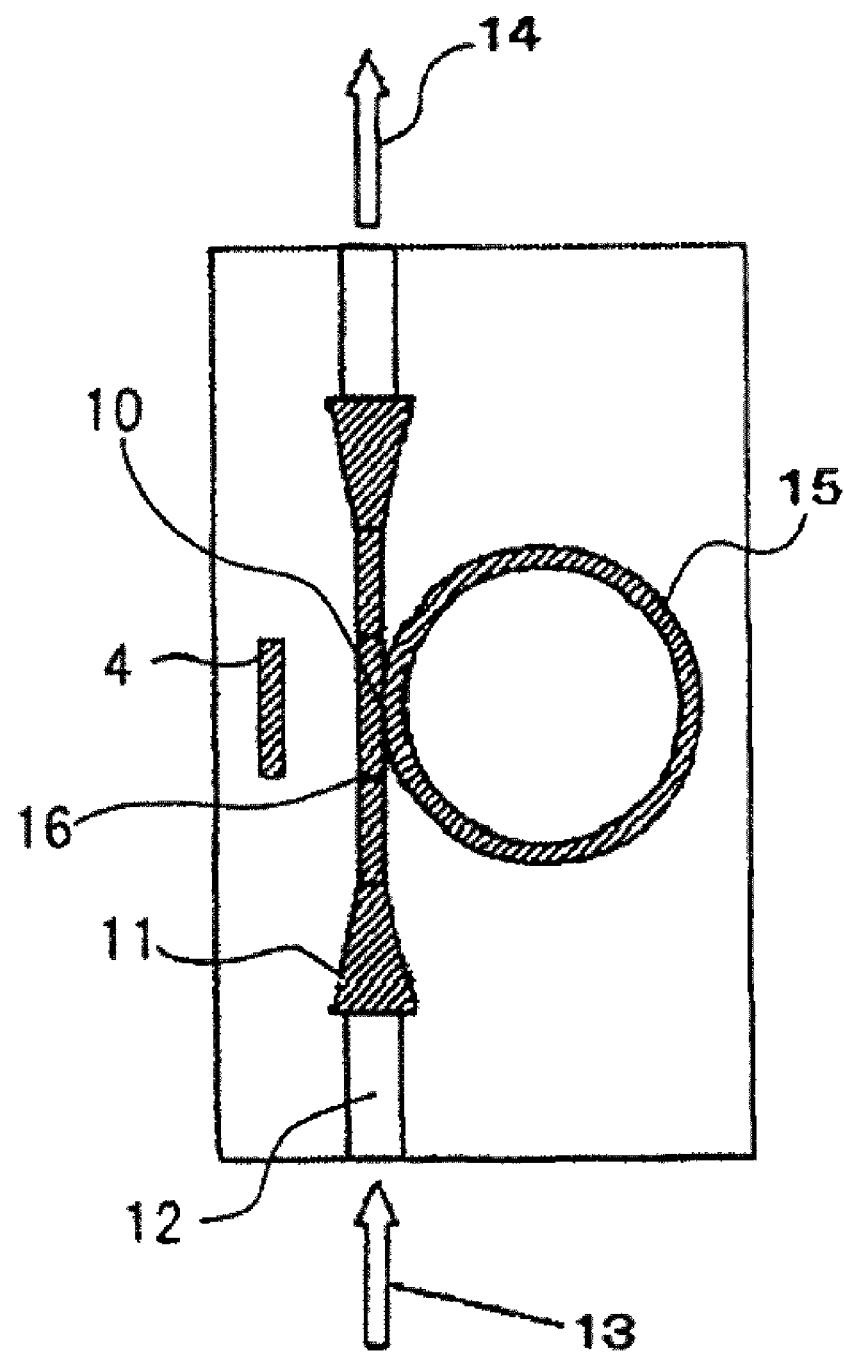
FIG. 7 is a plan view illustrating an optical modulator using a ring cavity optical oscillator including an optical phase modulation element of the invention.

FIG. 7 is a plan view illustrating an optical modulator using a ring cavity optical oscillator including an optical phase modulation element of the present invention. The optical modulator shown in this figure is characterized in that at least part of optical phase modulation element 10 of the present invention constitutes ring cavity optical oscillator 15. This structure makes it possible to shift the oscillating wavelength of ring cavity optical oscillator 15 by applying a voltage to optical phase modulation element 10 of the present invention as well as modulating the strength of output light by using the shift in the oscillating wavelength.

In addition, optical phase modulation element 10 of the present invention has a strong light confinement effect since it is constructed with a Plasmon waveguide, and thus can realize ring cavity optical oscillator 15 having a diameter of several micrometers or less. As a result, the optical modulator of this embodiment can be miniaturized more than that of the sixth embodiment using the Mach-Zehnder interferometer. Furthermore, in addition to miniaturization, merits such as high speed and low voltage operation can be realized by using ring cavity optical oscillator 15.

As described above with respect to the embodiments, since the Plasmon waveguide is used in the optical phase modulation element, optical confinement in an area in the order of 10 nanometers, which is impossible in a typical waveguide, can be realized. A charge accumulation layer of the semiconductor of the core, i.e., an overlap with a refractive index modulation area, can be enlarged. Furthermore, the Plasmon waveguide can obtain a greater change in the equivalent refractive index in response to a change in the refractive index of the semiconductor since an optical confinement effect is very large and the equivalent refractive index is greater than that of semiconductor core material. As a result, an optical phase modulation element having a high efficiency can be more realized, and the optical modulator including the optical phase modulation element can be significantly reduced in size than a conventional one. In addition, in the invention, the Plasmon waveguide and the optical waveguide can obtain a high coupling efficiency since they are continuously connected using the same semiconductor material and are connected in an insulated state using the taper coupling structure. Furthermore, the optical phase modulation element of the invention and the optical modulator using the same can be fabricated in a simple process since a metal member of the Plasmon waveguide also acts as an electrode.

According to the invention as set forth above, the optical confinement effect caused by the Plasmon waveguide allows realization of a high efficiency optical phase modulation element and a miniaturized optical modulator. In addition, an optical modulator can be realized having a high coupling efficiency and relatively small loss due to continuous bonding with an optical waveguide having the same semiconductor core material as the Plasmon waveguide.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

The invention claimed is:

1. An optical phase modulation element comprising:
a Plasmon waveguide including a clad made of metal having a complex dielectric constant with a negative real part in a used wavelength and a core made of dielectric material having a complex dielectric constant with a positive real part in the used wavelength; and
an optical waveguide connected to the Plasmon waveguide, the optical waveguide including a clad and a core made of dielectric material having a complex dielectric constant with a positive real part,
wherein at least part of the core of the Plasmon waveguide and the core of the waveguide is made of the same semiconductor material, and
wherein the Plasmon waveguide performs phase-modulation on incident light when a voltage is applied.

2. The optical phase modulation element of claim 1, wherein:
the cross section of the Plasmon waveguide has a metal insulator semiconductor structure including the core made of a semiconductor and insulator and the clad made of metal, and
the carrier density of the semiconductor is modulated by applying a voltage between the clad and the core, so as to change the equivalent refractive index of the Plasmon waveguide and modulate the phase of incident light.

3. The optical phase modulation element of claim 2, wherein the insulator of the core of the Plasmon waveguide is made of ferroelectric material.

4. The optical phase modulation element of claim 1, wherein:
at least part of the core of the Plasmon waveguide is made of P-N junction semiconductor, and
the equivalent refractive index of the Plasmon waveguide is changed and the phase of incident light is modulated by injecting carriers into the semiconductor.

5. The optical phase modulation element of claim 1, wherein the width of the semiconductor forming at least part of the core of the Plasmon waveguide is $\lambda/2n$ or less, where $\lambda$ is the wavelength of incident light, and n is the refractive index of the semiconductor.

6. The optical phase modulation element of claim 1, wherein part of the core of the Plasmon waveguide is made of material having an electro-optic effect.

7. The optical phase modulation element of claim 1, wherein the Plasmon waveguide and the optical waveguide are connected in an insulated state by a taper structure.

8. The optical phase modulation element of claim 7, wherein a metal clad of the taper structure and the metal clad of the Plasmon waveguide have an interval therebetween, and are not electrically connected but are optically continuous.

9. An optical modulator comprising a Mach-Zehnder interferometer, which is a combination of two optical phase modulation elements as described in claim 1.

10. An optical modulator comprising an optical oscillator, which includes at least part of an optical phase modulation element as described in claim 1.

11. The optical modulator of claim 10, wherein the optical oscillator comprises a ring cavity optical oscillator.

* * * * *